US008457136B2

United States Patent
Tu

(10) Patent No.: US 8,457,136 B2
(45) Date of Patent: Jun. 4, 2013

(54) METHOD, APPARATUS, AND COMPUTER PROGRAM PRODUCT FOR REDUCING SESSION SETUP LATENCY

(75) Inventor: Fangqiu Tu, Caldwell, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/454,794

(22) Filed: Apr. 24, 2012

(65) Prior Publication Data

US 2012/0207157 A1    Aug. 16, 2012

Related U.S. Application Data

(63) Continuation of application No. 11/627,433, filed on Jan. 26, 2007, now Pat. No. 8,179,894.

(51) Int. Cl.
*H04L 12/56* (2006.01)

(52) U.S. Cl.
USPC ........................................... 370/400; 709/227

(58) Field of Classification Search
None
See application file for complete search history.

(56) References Cited

U.S. PATENT DOCUMENTS

| 7,043,266 | B2 | 5/2006 | Chaturvedi et al. |
| 7,089,027 | B1 | 8/2006 | Welch et al. |
| 7,277,423 | B1 | 10/2007 | Welch |
| 7,620,412 | B2 | 11/2009 | Yu et al. |
| 2002/0061759 | A1 | 5/2002 | Maggenti et al. |
| 2002/0152299 | A1 | 10/2002 | Traversat et al. |
| 2003/0148779 | A1* | 8/2003 | Aravamudan et al. ........ 455/519 |
| 2004/0170125 | A1 | 9/2004 | O'Neill |
| 2005/0141511 | A1 | 6/2005 | Gopal |
| 2005/0201284 | A1 | 9/2005 | Cheriton |
| 2005/0266867 | A1 | 12/2005 | Harris et al. |
| 2008/0062863 | A1* | 3/2008 | Ginde ........................... 370/221 |

* cited by examiner

*Primary Examiner* — Brian Roberts

(57) ABSTRACT

An apparatus for reducing session setup latency includes a processing element. The processing element is configured to determine a status with respect to a response message made in response to an invite message associated with a communication session, determine a status with respect to media packets being communicated between nodes of a network, make a determination with respect to an acknowledgment message based at least in part on the status determination with respect to the response message and the status determination with respect to media packets, and control setup of a communication session based on the determination with respect to the acknowledgement message.

19 Claims, 8 Drawing Sheets

METHOD, APPARATUS, AND COMPUTER PROGRAM PRODUCT FOR REDUCING SESSION SETUP LATENCY

RELATED APPLICATIONS

This application is a continuation of U.S. patent application Ser. No. 11/627,433, filed on Jan. 26, 2007.

TECHNOLOGICAL FIELD

Embodiments of the present invention relate generally to session setup techniques, and, more particularly, relate to a method, apparatus, and computer program product for reducing setup latency.

BACKGROUND

Given the ubiquitous nature of mobile electronic devices such as, for example, mobile communication devices like cellular telephones, many people are utilizing an expanding variety of applications that are executable at such mobile electronic devices. For example, applications for providing services related to communications, media sharing, information gathering, education, gaming, and many others have been developed, fueled by consumer demand. One particular area in which consumer demand has triggered an expansion of services relates to the establishment of communication sessions during which, for example, Internet telephone calls, multimedia distribution, multimedia conferences and the like may be established. One particular protocol for setting up such sessions is the Session Initiation Protocol (SIP).

SIP is an application-layer control (signaling) protocol for creating, modifying, and terminating sessions with one or more participants. SIP is widely used as a signaling protocol for Voice over Internet Protocol (VoIP) and media sharing applications. SIP is addressing neutral, with addresses expressed as a uniform resource locator (URL), a uniform resource identifier (URI), a telephone number, an email like address, or the like. SIP is generally considered to be lightweight since it has a limited number of methods to reduce complexity, and transport-independent since it can be used with User Datagram Protocol (UDP), Transport Control Protocol (TCP) and other transport protocols.

SIP clients may use, for example, TCP or UDP to connect to a SIP server and/or other SIP endpoints. As such, SIP may be used in setting up and tearing down voice or video calls or in any application where session initiation is employed. SIP, therefore, provides a signaling and call setup protocol for IP-based communications that can support a superset of call processing functions and features present in the public switched telephone network (PSTN).

SIP is a peer-to-peer protocol which works in concert with several other protocols and is typically only involved in the signaling portion of a communication session. SIP invitations are used to create sessions and SIP signaling is used to carry session descriptions that allow participants to agree on a set of compatible media types. SIP servers, or proxy servers, may help route requests to users, authenticate and authorize users for services, implement provider call-routing policies, provide features to users, etc. SIP also provides a registration function to allow users to upload their current locations to the proxy server.

Despite the great utility of SIP, SIP signaling messages could be considered by some to be bulky since they may have a message size of about 1000 bytes. Accordingly, it may become difficult to efficiently transport SIP messages over radio frequency (RF) channels since RF channels may be bandwidth limited. For client-server based applications in which many SIP messages are communicated between clients and servers, delays (or latency) may be experienced. Delays, in general, are problematic for real-time sensitive applications.

Accordingly, it may be desirable to provide a mechanism by which to reduce the latency associated with SIP session initiation.

BRIEF SUMMARY

A method, apparatus and computer program product are therefore provided for reducing session setup latency. In particular, a method, apparatus and computer program product are provided that reduce the amount of overhead involved in session setup. In this regard, embodiments of the present invention may enable the use of media packets instead of an acknowledgement message to indicate that an initiating terminal or a network component is still available. Accordingly an amount of signaling used during session setup may be reduced and setup time may also be reduced.

In one exemplary embodiment, a method of reducing session setup latency is provided. The method includes determining a status with respect to a response message made in response to an invite message associated with a communication session, determining a status with respect to media packets being communicated between nodes of a network, making a determination with respect to an acknowledgment message based at least in part on the status determination with respect to the response message and the status determination with respect to media packets, and controlling setup of the communication session based on the determination with respect to the acknowledgement message.

In another exemplary embodiment, a computer program product for reducing session setup latency is provided. The computer program product includes at least one computer-readable storage medium having computer-readable program code portions stored therein. The computer-readable program code portions include first, second, third and fourth executable portions. The first executable portion is for determining a status with respect to a response message made in response to an invite message associated with a communication session. The second executable portion is for determining a status with respect to media packets being communicated between nodes of a network. The third executable portion is for making a determination with respect to an acknowledgment message based at least in part on the status determination with respect to the response message and the status determination with respect to media packets. The fourth executable portion is for controlling setup of the communication session based on the determination with respect to the acknowledgement message.

In another exemplary embodiment, an apparatus for reducing session setup latency is provided. The apparatus includes a processing element. The processing element may be configured to determine a status with respect to a response message made in response to an invite message associated with a communication session, determine a status with respect to media packets being communicated between nodes of a network, make a determination with respect to an acknowledgment message based at least in part on the status determination with respect to the response message and the status determination with respect to media packets, and control setup of a communication session based on the determination with respect to the acknowledgement message.

Embodiments of the invention may provide a method, apparatus and computer program product for reducing session setup latency. As a result, for example, users of services associated with establishment of communication sessions such as SIP sessions may experience less latency in setting up of the communication sessions.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. More particularly, implementations of certain embodiments may take the form of web-implemented computer software. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
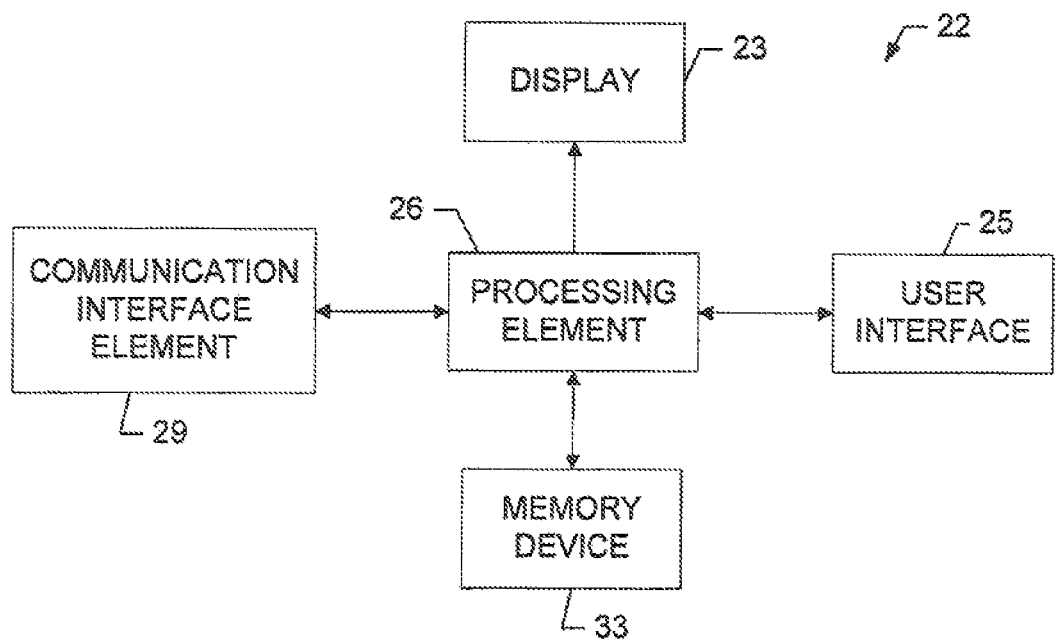
FIG. 1 is a schematic block diagram of a mobile terminal according to an exemplary embodiment of the present invention.

FIG. 1 is a schematic block diagram of a mobile terminal which may act as a client device according to an exemplary embodiment of the present invention. It should be understood, however, that a mobile terminal as illustrated and hereinafter described is merely illustrative of one type of apparatus that would benefit from embodiments of the present invention and, therefore, should not be taken to limit the scope of embodiments of the present invention. Types of mobile terminals which may employ embodiments of the present invention include but are not limited to devices such as portable digital assistants (PDAs), pagers, mobile televisions, gaming devices, music players, laptop computers, mobile telephones and other types of audio, voice and text communications systems. In addition to mobile devices, fixed devices may also employ embodiments of the present invention.

As shown in FIG. 1, in addition to a display 23 and user interface 25, a mobile terminal 22 may include a processing element 26, a communication interface element 29 and a memory device 33. The memory device 33 may include, for example, volatile or non-volatile memory. The memory device 33 may be configured to store information, data, applications, instructions or the like for enabling the mobile terminal 22 to carry out various functions in accordance with exemplary embodiments of the present invention. For example, the memory device 33 could be configured to store an application for enabling communication with other users via a session such as a Session Initiation Protocol (SIP) session. Additionally or alternatively, the memory device 33 could be configured to store other data including, for example, multimedia content for communication or sharing with other terminals.

The processing element 26 may be embodied in many ways. For example, the processing element 26 may be embodied as a processor, a coprocessor, a controller or various other processing means or devices including integrated circuits such as, for example, an ASIC (application specific integrated circuit). In an exemplary embodiment, the processing element 26 may be configured to execute instructions stored in the memory device 33 or otherwise accessible to the processing element 26. In an exemplary embodiment, the processing element 26 may be configured to execute a communication session establishment application and/or a content sharing application stored in the memory device 33 or otherwise accessible to the processing element 26. Meanwhile, the communication interface element 29 may be embodied as any device or means embodied in either hardware, software, or a combination of hardware and software that is configured to receive and/or transmit data from and/or to a network.

The communication interface element 29 may include an antenna or multiple antennae in operable communication with a transmitter and/or a receiver. Accordingly, the mobile terminal 22 may be configured to communicate signals that may include signaling information in accordance with an air interface standard of an applicable cellular system, and also user speech and/or user generated data. As such, the mobile terminal 22 may be capable of operating with one or more air interface standards, communication protocols, modulation types, and access types.

The display 23 may be, for example, a conventional LCD (liquid crystal display) or any other suitable display known in the art upon which images may be rendered. The user interface 25 may include, for example, a keyboard, keypad, joystick, function keys, mouse, scrolling device, touch screen, or any other mechanism or input device by which a user may interface with the mobile terminal 22.

Figure 2:
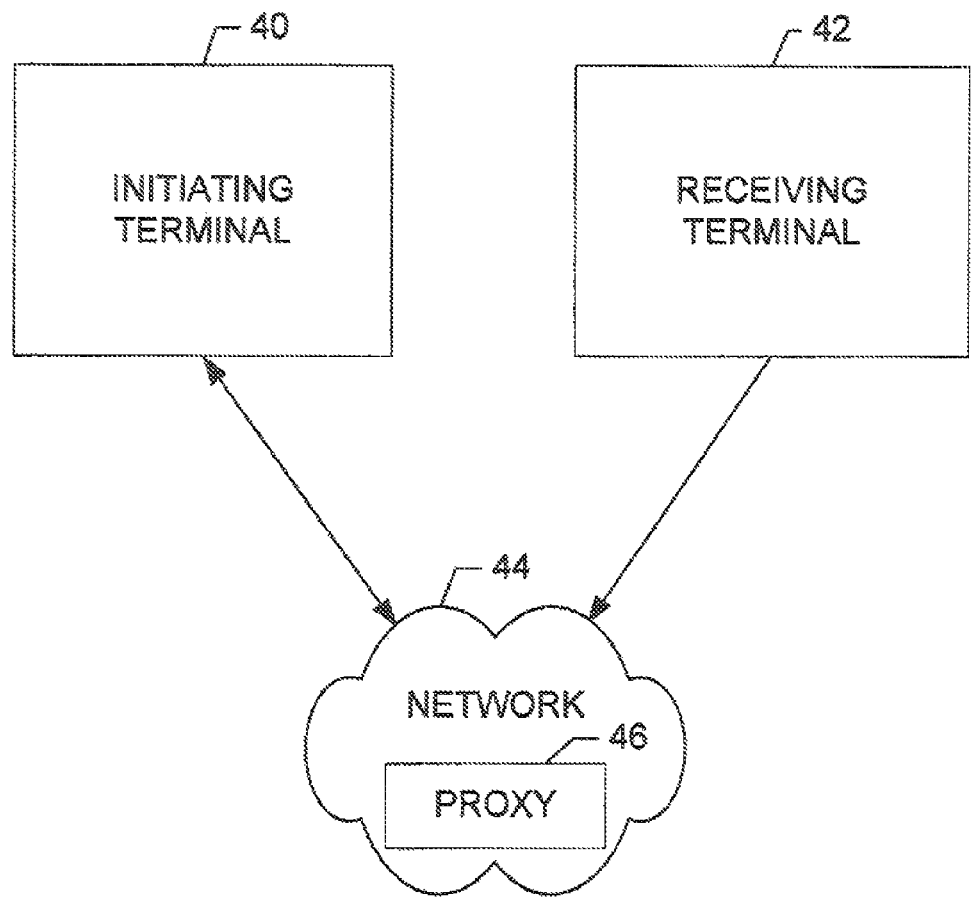
FIG. 2 is a schematic block diagram of a wireless communications system for establishing a communication session according to an exemplary embodiment of the present invention.

FIG. 2 is a schematic block diagram of a wireless communications system for establishing a communication session according to an exemplary embodiment of the present invention. In an exemplary embodiment, the system of FIG. 2 may be capable of facilitating communications in accordance with SIP (e.g., establishing a SIP session) although other communication sessions may also be established. As such, FIG. 2 is a simplified schematic diagram illustrating a system capable of supporting communication between network nodes such as an initiating terminal 40 and a receiving terminal 42 between which a session may be provided in connection with SIP communications via a network 44. In this regard, it should be noted that the network 44 may include any combination of wireless or wired networks such as, for example, private networks, cellular networks, public networks, etc. The network 44 may include at least one proxy 46, which may be associated with, for example, the network nodes of the network 44. The proxy 46 may be capable of receiving and forwarding SIP signaling messages and/or messages from another protocol used for session setup. In an exemplary embodiment, the proxy 46 may be a server or other computing device configured to enable communication of messages, such as SIP signaling messages, to and/or from the initiating terminal 40 and the receiving terminal 42. As such, the proxy 46 may also include elements similar to those of the mobile terminal 22 described in reference to FIG. 1. Although signals will be described hereinafter as passing between the initiating and receiving terminals 40 and 42, it should be understood that such signals are communicated via the network 44 and also via the at least one proxy 46 where applicable. It should also be understood that the initiating and receiving terminals 40 and 42 may be examples of the mobile terminal 22 of FIG. 1, or any other suitable communications device.

SIP could be thought to enable, for example, alerting the receiving terminal 42 of a session invitation such as a voice over IP based voice call from the initiating terminal 40. For example, an SIP INVITE message could be used to announce a call to the receiving terminal 42. In a typical SIP call setup sequence, the receiving terminal 42 may provide a response to the initiating terminal 40 indicating acceptance of the invitation. The initiating terminal 40 may then acknowledge the response from the receiving terminal 42, prior to commencement of communications associated with the voice call itself.

Figure 3:
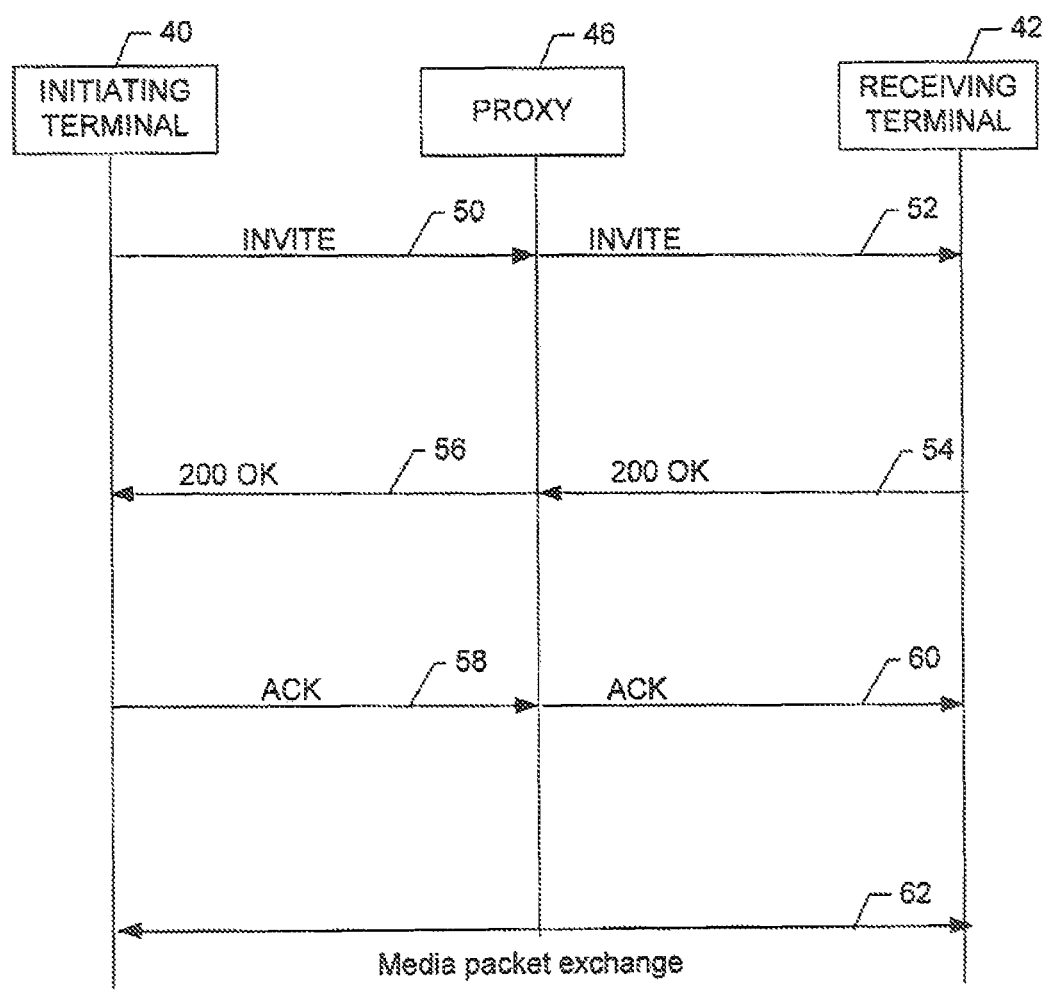
FIG. 3 is a control flow diagram illustrating communications involved in setting up a session according to a conventional method.

FIG. 3 is a control flow diagram illustrating communications involved in setting up a communication session according to a conventional method. In the exemplary embodiment of FIG. 3, the communication session may be utilized for communication or sharing of media packets between the initiating terminal 40 and the receiving terminal 42. As shown in FIG. 3, the initiating terminal 40 may communicate an invite message to the proxy 46 at operation 50. The proxy 46 may then communicate the invite message to the receiving terminal 42 at operation 52. The receiving terminal 42 may provide a response to the invitation using a "200 OK" response at operation 54, which may be received at the proxy 46 and relayed to the initiating terminal at operation 56. The initiating terminal 40 may then acknowledge the response from the receiving terminal at operation 58 by communicating an "ACK" message to the proxy 46. The proxy 46 may then communicate the "ACK" message to the receiving terminal 42 at operation 60. At operation 62, media packets may be exchanged between the receiving terminal 42 and the initiating terminal 40 via the established communication session.

As may be appreciated by examining FIG. 3, there may be a delay in session initiation due to the exchange of invite, response and acknowledge messages between the initiation terminal 40, the receiving terminal 42 and the proxy 46. Thus, according to embodiments of the present invention, a mechanism may be established to reduce latency involved in session setup by utilizing the delivery of media packets themselves as an acknowledgement of the "200 OK" response. In this regard, the acknowledgement is typically utilized to verify for the proxy 46, that the initiating terminal 40 is still available. In the same regard, the acknowledgement may also be utilized to verify for receiving terminal 42, that the proxy 46 is available. Accordingly, a reduction in session setup time and a reduction in the signaling associated with session setup may be experienced due to elimination of the need to send a separate acknowledgement message since the delivery of data (e.g., delivery of the first media packets) may serve as acknowledgement to the proxy 46.

Figure 4:
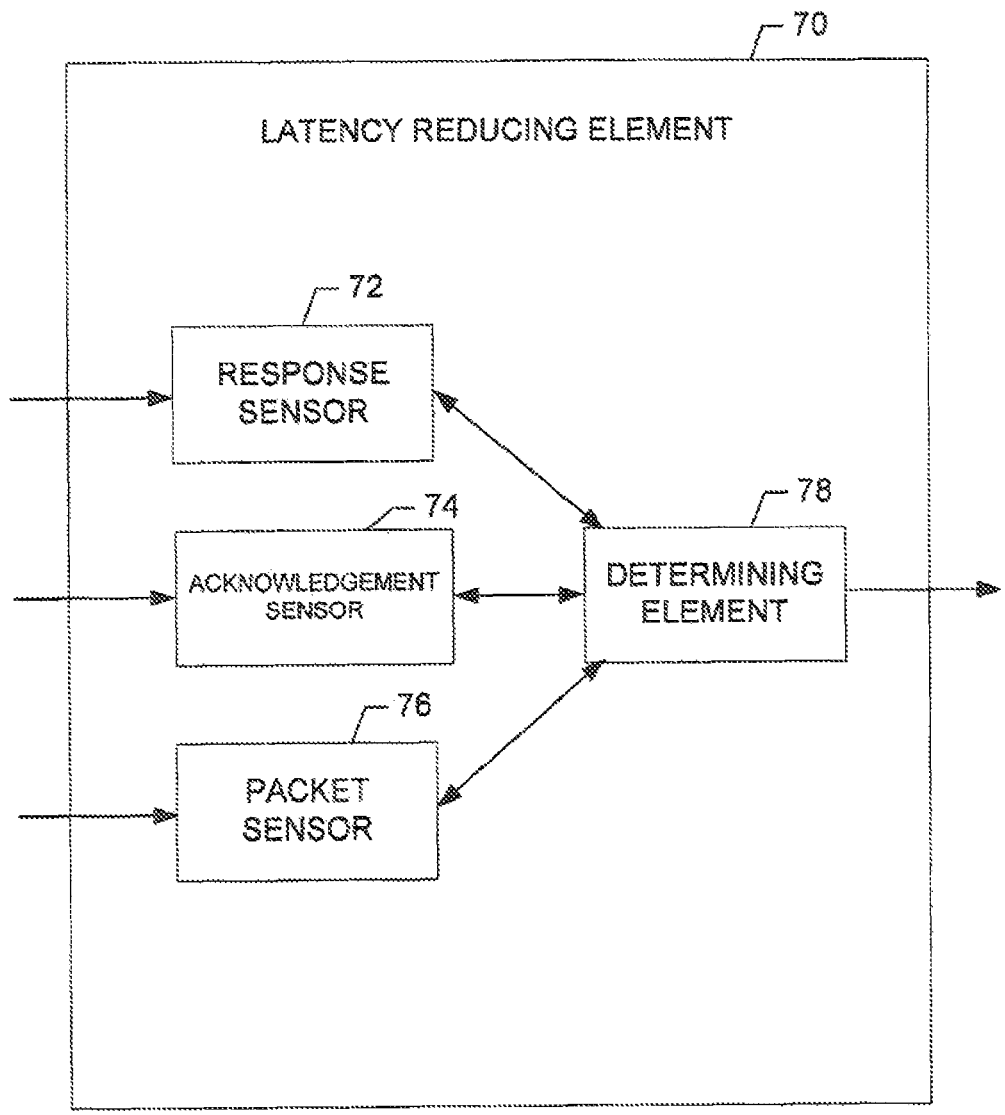
FIG. 4 is a simplified schematic diagram showing an apparatus for providing reduced session setup latency according to an exemplary embodiment of the present invention.

FIG. 4 is a simplified schematic diagram showing an apparatus for providing reduced session setup latency according to an exemplary embodiment of the present invention. In this regard, the apparatus of FIG. 4 may be embodied as a latency reducing element 70, which may operate under the control of, or otherwise be embodied as, the processing element 26. Alternatively, the apparatus of FIG. 4 may also be embodied at a network component. According to an exemplary embodiment, the latency reducing element 70 may be embodied separately at each of one or more of the initiating terminal 40, the proxy 46 and the receiving terminal 42. Thus the latency reducing element 70 may function at one or more of the initiating terminal 40, the proxy 46 and the receiving terminal 42 in order to reduce latency for session setup by enabling the communication of data packets (e.g., media packets) to serve as acknowledgement instead of an actual "ACK" message.

The latency reducing element 70 may be embodied as any device or means embodied in either hardware, software, or a combination of hardware and software that is configured to enable the corresponding device or network component in which the latency reducing element 70 resides to allow communication of data packets (e.g., media packets) to serve as acknowledgement of receipt of a response to an invitation. In an exemplary embodiment, the latency reducing element 70 may include a response sensor 72, an acknowledgement sensor 74, and a packet sensor 76 which each may be in communication with a determining element 78. The response sensor 72, the acknowledgement sensor 74, and the packet sensor 76 may each be embodied as any device or means embodied in either hardware, software, or a combination of hardware and software that is configured to enable the corresponding sensor to detect signaling messages and/or data associated with response, acknowledgement and data or media packets, respectively.

For example, the response sensor 72 may be configured to determine whether the corresponding device at which the response sensor 72 is resident (e.g., the initiating terminal 40, the proxy 46 or the receiving terminal 42) has received or sent a response message in response to an invite message. The response sensor 72 may then communicate such determination to the determining element 78 to indicate to the determining element 78 whether the corresponding device or network component has received and/or sent a response (e.g., the "200 OK" message).

As another example, the acknowledgement sensor 74 may be configured to determine whether the corresponding device at which the acknowledgement sensor 74 is resident (e.g., the initiating terminal 40, the proxy 46 or the receiving terminal 42) has received an acknowledgement message (e.g., "ACK") in response to a response message. The acknowledgement sensor 74 may then communicate such determination to the determining element 78 to indicate to the determining element 78 whether the corresponding device has received an acknowledgement message (e.g., "ACK").

The packet sensor 76 may be configured to determine whether the corresponding device at which the packet sensor 76 is resident (e.g., the initiating terminal 40, the proxy 46 or the receiving terminal 42) has received data or media packets or otherwise has data or media packets waiting to be transmitted. The packet sensor 76 may then communicate such determination to the determining element 78 to indicate to the determining element 78 whether the corresponding device has received data or media packets or has data or media packets waiting to be transmitted.

The determining element 78 may be embodied as any device or means embodied in either hardware, software, or a combination of hardware and software that is configured to control operations of the corresponding device at which the determining element 78 is resident based on information related to receipt or presence of media packets subsequent to receipt or sending of a response to an invitation in the absence of receipt of an acknowledgement message. For example, the determining element 78 may be configured to determine whether media packets are waiting to be communicated or otherwise transmitted in response to receipt of a response to an invitation message (e.g., a "200 OK" message). If the media packets are waiting, the determining element 78 may cause the media packets to be communicated without the sending of an acknowledgement message (e.g., an "ACK" message). However, if there are no media packets waiting, the acknowledgement message may be communicated. In other words, if session setup time and signaling overhead may be reduced by sending packets instead of an "ACK" message, the determining element 78 will do so, but if no packets are available, the determining element 78 will operate normally by sending the "ACK" message. The determining element 78 may also or alternatively be configured to determine whether media packets have been received subsequent to sending a response to an invitation message from the corresponding device at which the determining element 78 is resident. In this regard, for example, the determining element 78 may, in response to receipt of media packets after (although not necessarily immediately after) sending a "200 OK" response, complete a call setup if there has also not been an "ACK" message received.

In some exemplary embodiments, the latency reducing element 70 may also include a retransmission timer configured to determine a time between sending a response to the invite message and receipt of an acknowledgement message. According to an exemplary embodiment, when the determining element 78 receives either an "ACK" message or media packets, if a response has previously been sent by the corresponding device, then the retransmission timer may be canceled and call setup may be complete. If, however, the retransmission timer times out between sending a response and receipt of an acknowledgement message, the retransmission timer may cause the response to be resent.

Figure 5:
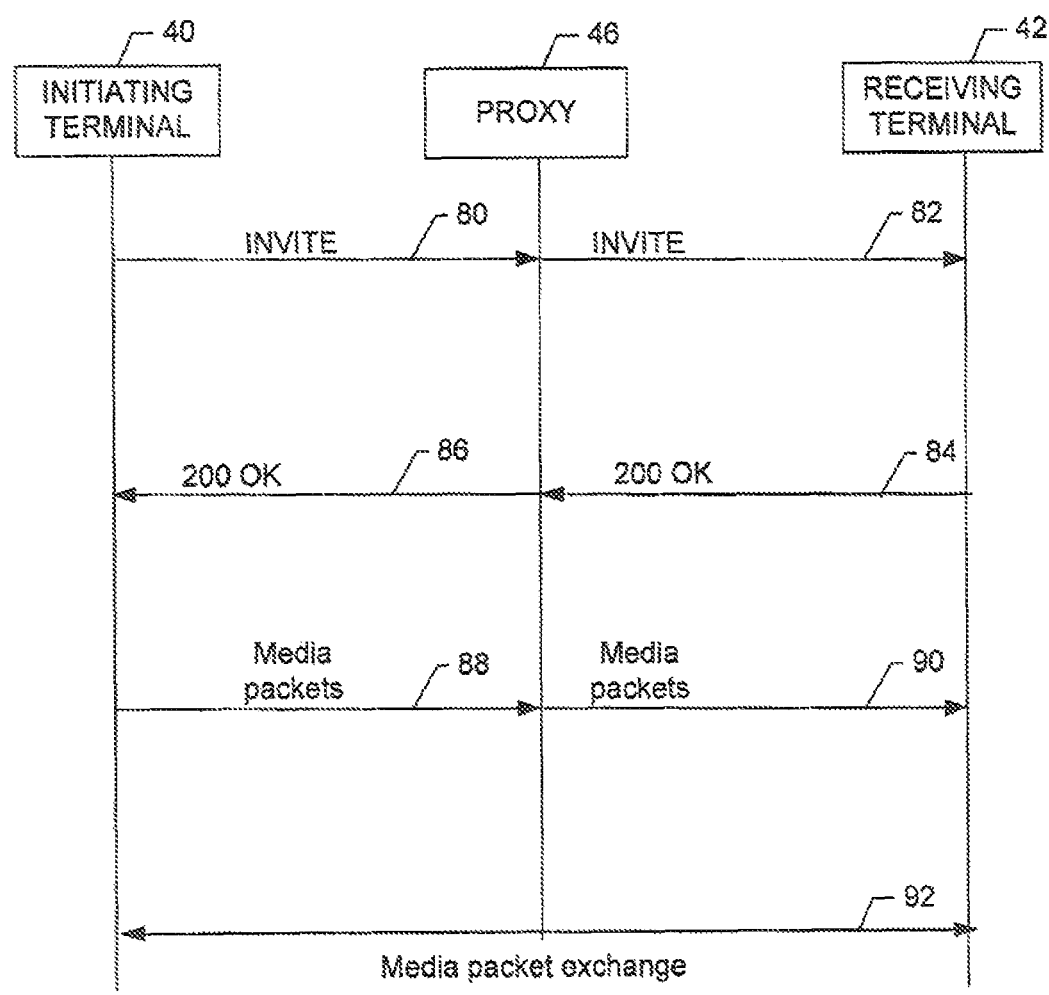
FIG. 5 is a control flow diagram illustrating communications involved in setting up a session according to exemplary embodiments of the present invention.

FIG. 5 is a control flow diagram illustrating communications involved in setting up a session according to exemplary embodiments of the present invention. As shown in FIG. 5, the initiating terminal 40 may communicate an invite message to the proxy 46 at operation 80. The proxy 46 may then communicate the invite message to the receiving terminal 42 at operation 82. The receiving terminal 42 may provide a response to the invitation using a "200 OK" response at operation 84, which may be received at the proxy 46 and relayed to the initiating terminal 40 at operation 86. The proxy 46 may, in response to receipt, of the "200 OK" response from the receiving terminal 42, determine whether the proxy 46 has buffered data (e.g., a prerecorded message or tone) intended for the receiving terminal 42, which could be sent to the receiving terminal 42 instead of an acknowledgement message. Upon receipt of the "200 OK" response from the proxy 46 at operation 86, the initiating terminal 40 may then, if media packets are waiting to be communicated, to the receiving terminal 42, communicate the media packets to the proxy 46 based on the determining element 78 determining that the media packets are waiting to be communicated and a response to the invite message has been received at operation 88. The proxy 46 (or the determining element of the proxy 46) may, in response to receipt of the media packets, cancel or reset any retransmission timer which may be running and communicate the media packets to the receiving, terminal 42 at operation 90. The receiving terminal 42 may also cancel or reset any retransmission timer that may be running and call setup may be completed in response to receipt of the media packets from the proxy 46. Thereafter, media packets may be exchanged between the receiving terminal 42 and the initiating terminal 40 via the established communication session at operation 92.

Figure 6:
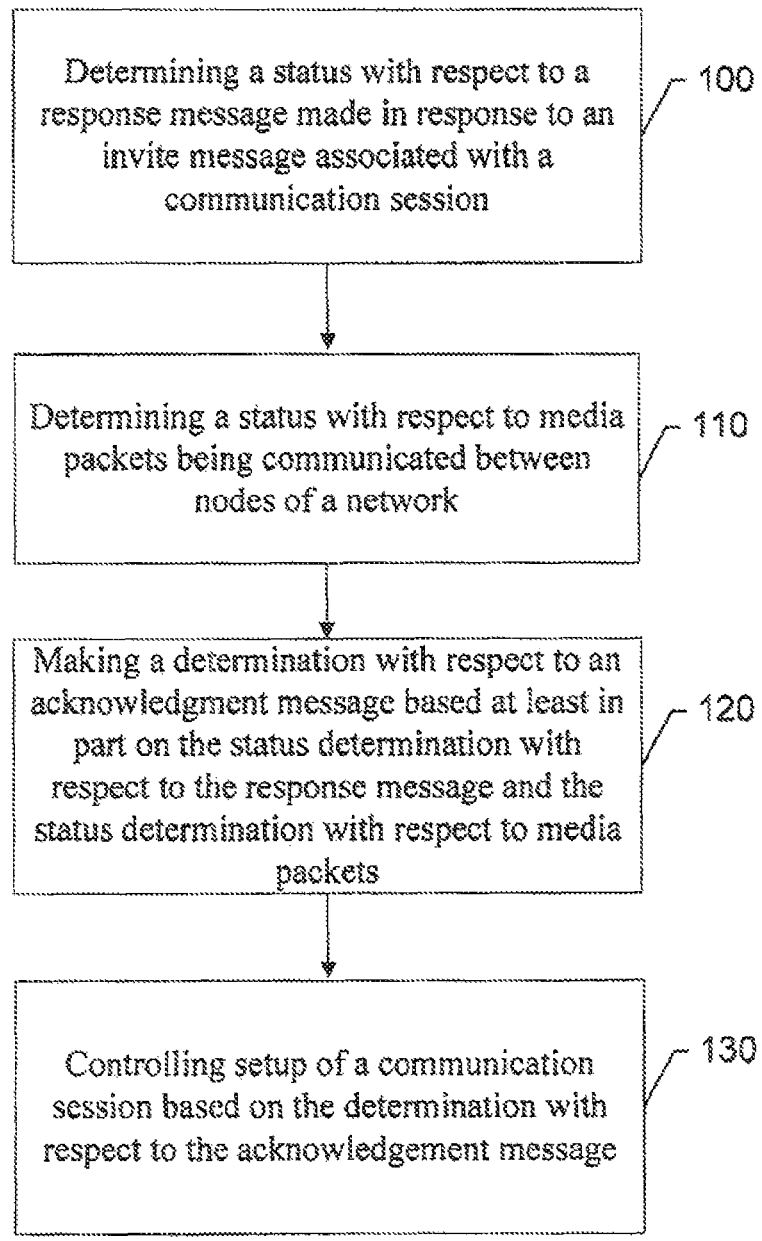
FIG. 6 is a flowchart according to an exemplary method for providing reduced session setup latency according to an exemplary embodiment of the present invention.

FIG. 6 is a flowchart according to an exemplary method and program product for providing reduced session setup latency according to an exemplary embodiment of the present invention. As will be appreciated, for example, computer program instructions may be loaded onto a computer or other programmable apparatus (i.e., hardware) to produce a machine, such that instructions which execute on the computer or other programmable apparatus create means for implementing the functions specified in the flowcharts block (s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

In this regard, one embodiment of a method of providing reduced latency in session setup, as shown in FIG. 6, may include determining a status with respect to a response message made in response to an invite message associated with a communication session at operation 100. In an exemplary embodiment, the determination made at operation 100 could be either that a response (e.g., a "200 OK" message) has been sent or that a response has been received at the device performing the method. At operation 110, a determination may be made regarding a status with respect to media packets being communicated between nodes of a network. In an exemplary embodiment, the determination made at operation 110 could be either that media packets have or have not been received or that media packets are or are not waiting to be communicated between the nodes. In various embodiments, the determination regarding whether media packets have or have not been received may be made only if, in addition to, or in parallel with a determination that no acknowledgement message has been received by the device performing the method. The method may further include making a determination with respect to an acknowledgment message based on the status determination with respect to the response message and the status determination with respect to media packets at operation 120. At operation 130, operation of a communication device may be controlled (e.g., by setting: up of a communication session) based on the determination with respect to the acknowledgement message. In an exemplary embodiment, the determination with respect to the acknowledgement message may include a determination regarding whether to transmit media packets without sending an acknowledgment message or to transmit the acknowledgement message at operation 130, or a determination regarding whether an acknowledgement message has been received.

Figure 7:
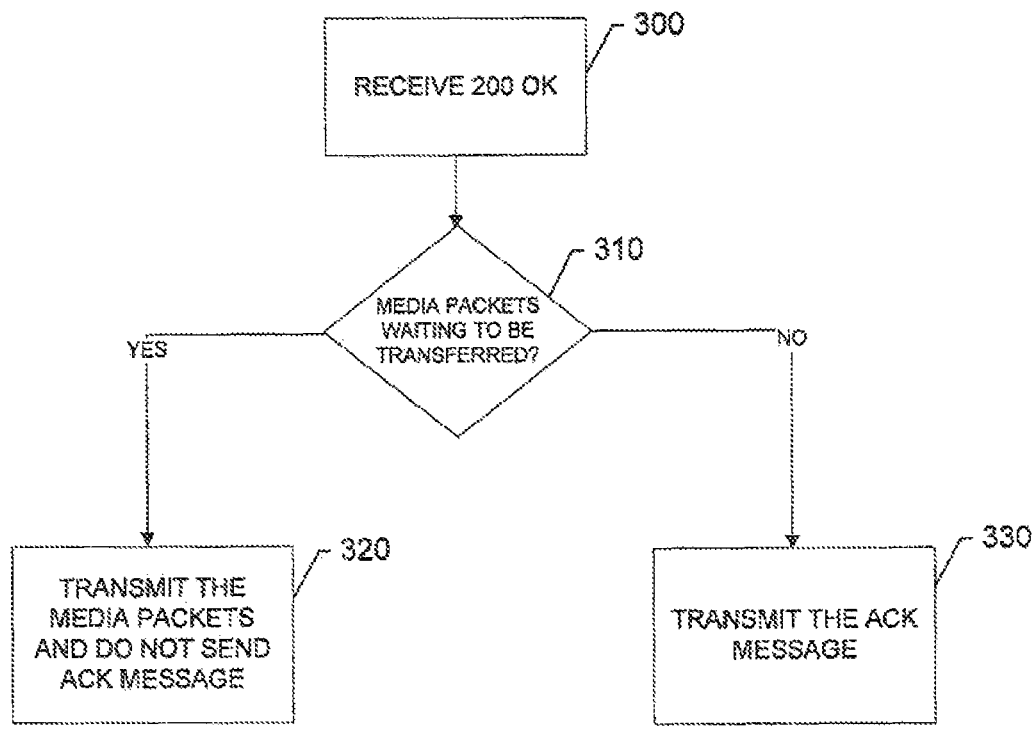
FIG. 7 is a flowchart according to an exemplary method for providing reduced session setup latency at an initiating terminal or proxy according to an exemplary embodiment of the present invention.

As may be appreciated, embodiments of the present invention may be practiced at each of the initiating terminal 40, the proxy 46 and the receiving terminal 42. Accordingly, for example, a particular device may operate as one of the initiating terminal 40, the proxy 46 or the receiving terminal 42 in any particular scenario. However, depending on the role of the particular device in a particular scenario, different operations may be performed. FIG. 7 is a flowchart according to an exemplary method and program product for providing reduced session setup latency at an initiating terminal or proxy according to an exemplary embodiment of the present invention, while FIG. 8 is a flowchart according to an exemplary method and program product for providing reduced session setup latency at a receiving terminal or proxy according to an exemplary embodiment of the present invention.

As shown in FIG. 7, a response (e.g., the "200 OK" message) to an invite message may be received at operation 300. At operation 310, a determination may be made as to whether media packets are waiting to be communicated to the receiving terminal. If media packets are waiting, the media packets may be communicated to the receiving terminal (e.g., via the proxy) at operation 320 and no acknowledgement message (e.g., "ACK" message) may be sent. However, if no media packets are waiting, the acknowledgement message (e.g., "ACK" message) may be sent at operation 330.

Figure 8:
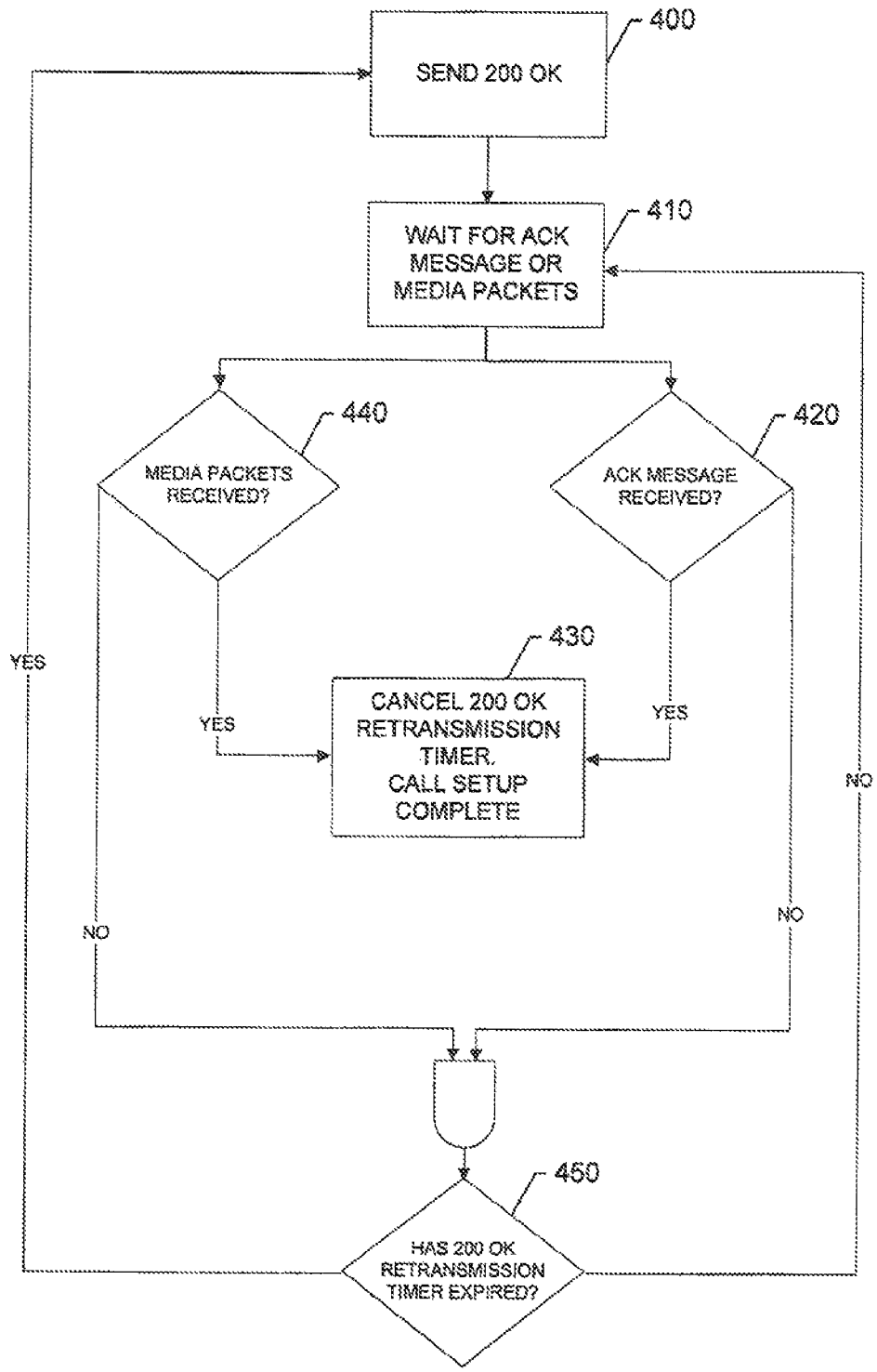
FIG. 8 is a flowchart according to an exemplary method for providing reduced session setup latency at a receiving terminal or proxy according to an exemplary embodiment of the present invention.

As shown in FIG. 8, a response (e.g., the "200 OK" message) to an invite message may be sent at operation 400. A waiting period may then be entered prior to receipt of either an acknowledgement message (e.g., "ACK" message) or media packets at operation 410. A determination may be made with respect to receipt of the acknowledgement message at operation 420. If the acknowledgement message has been received, a retransmission timer may be canceled and session (e.g., call) setup may be complete at operation 430. A determination may also be made with respect to receipt of media packets at operation 440. If the media packets have been received; a retransmission timer may be canceled and session (e.g., call) setup may be complete at operation 430. However, if the acknowledgement message has not been received and media packets have also not been received, then a determination may be made as to whether the retransmission timer has expired at operation 450. If the retransmission timer has expired, then another response may be sent at operation 400. If the retransmission timer has not expired, the waiting period for receiving the acknowledgment message or the media packets may be repeated at operation 410.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for reducing session setup latency comprising:
receiving, at a communications server, a response message made in response to an invite message associated with a communication session initiated by an initiating terminal, and then transmitting said response message from said communications server to the initiating terminal;
establishing the communication session at the communications server in response to the communications server receiving media packets from the initiating terminal without the communications server having received an acknowledgment message from the initiating terminal in response to the response message; and
at least one of
(i) determining whether the response message has been received from the communications server,
in response to determining that the response message has been received, determining whether the media packets are available for transmission,
in response to determining that the media packets are available for transmission, transmitting the media packets without transmitting the acknowledgment message, and
in response to determining that the media packets are not available for transmission, transmitting the acknowledgment message to the communications server;
(ii) determining a status with respect to transmission of the response message from the communications server to the initiating terminal, and after determining that the response message has been transmitted to the initiating terminal, establishing the communication session upon receiving whichever arrives first from the initiating terminal, the media packets or the acknowledgment message; or
(iii) determining whether the media packets have been received, and cancelling a retransmission timer, on which retransmission of the response message from the communications server to the initiating terminal is based, once the communications server has determined that the media packets have been received.

2. The method of claim 1, wherein said method comprises, at the initiating terminal:
(i) determining whether the response message has been received from the communications server,
in response to determining that the response message has been received, determining whether the media packets are available for transmission, in response to determining that the media packets are available for transmission, transmitting the media packets without transmitting the acknowledgment message, and in response to determining that the media packets are not available for transmission, transmitting the acknowledgment message to the communications server.

3. The method according to claim 2, further comprising at the communications server:

cancelling a retransmission timer, on which retransmission of the response message from the communications server to the initiating terminal is based, once the communications server has determined that the acknowledgment message has been received.

4. The method of claim 1, wherein said method comprises, at the communications server:

(ii) determining a status with respect to transmission of the response message from the communications server to the initiating terminal, and after determining that the response message has been transmitted to the initiating terminal, establishing the communication session upon receiving whichever arrives first from the initiating terminal: the media packets or the acknowledgment message.

5. The method according to claim 1, wherein said method comprises, at the communications server:

(iii) determining whether the media packets have been received, and cancelling a retransmission timer, on which retransmission of the response message from the communications server to the initiating terminal is based, once the communications server has determined that the media packets have been received.

6. The method according to claim 1, wherein establishing the communication session comprises establishing a session initiation protocol (SIP) session.

7. A computer program product for reducing session setup latency, the computer program product comprising at least one non-transitory computer-readable storage medium having computer-readable program code portions stored therein, the computer-readable program code portions comprising:

a first executable portion for receiving, at a communications server, a response message made in response to an invite message associated with a communication session initiated by an initiating terminal, and then transmitting said response message from said communications server to the initiating terminal;

a second executable portion for establishing the communication session at the communications server in response to the communications server receiving media packets from the initiating terminal without the communications server having received an acknowledgment message from the initiating terminal in response to the response message; and at least one of:

(i) a third executable portion for, at the communications server, determining a status with respect to transmission of the response message from the communications server to the initiating terminal, and after determining that the response message has been transmitted, to the initiating terminal, establishing the communication session upon receiving whichever arrives first from the initiating terminal: the media packets or the acknowledgment message; or (ii) a fourth executable portion for, at the communications server, determining whether the media packets have been received, and cancelling a retransmission timer, on which retransmission of the response message from the communications server to the initiating terminal is based, once the communications server has determined that the media rackets have been received.

8. The computer program product of claim 7, further comprising a fifth executable for establishing the communication session at the communications server in response to the communications server receiving an acknowledgment message from the initiating terminal in response to the response message without the communications server having received the media packets from the initiating terminal.

9. The computer program product of claim 8 further comprising a sixth executable portion for cancelling a retransmission timer, on which retransmission of the response message from the communications server to the initiating terminal is based, once the communications server has determined that the acknowledgment message has been received at the communications server.

10. The computer program product of claim 7, wherein said computer program product comprises said third executable portion for, at the communications server:

determining a status with respect to transmission of the response message from the communications server to the initiating terminal; and after determining that the response message has been transmitted to the initiating terminal, establishing the communication session upon receiving whichever arrives first from the initiating terminal, the media packets or the acknowledgment message.

11. The computer program product of claim 7, wherein said computer product comprises said fourth executable portion for, at the communications server:

determining whether the media packets have been received; and cancelling a retransmission timer, on which retransmission of the response message from the communications server to the initiating terminal is based, once the communications server has determined that the media packets have been received.

12. The computer program product of claim 7, wherein the second executable portion establishes the communication session by setting up a session initiation protocol (SIP) session.

13. An apparatus for reducing session setup latency comprising a processing element configured to:

receive a response message made in response to an invite message associated with a communication session initiated by an initiating terminal, and then transmit said response message from said apparatus to the initiating terminal;

establish the communication session in response to receiving media packets from the initiating terminal without having received an acknowledgment message from the initiating terminal in response to the response message; and at least one of:

(i) determine a status with respect to transmission of the response message from said apparatus to the initiating terminal, and after determining that the response message has been transmitted to the initiating terminal, establish the communication session upon receiving whichever arrives first from the initiating terminal: the media packets or the acknowledgment message; or (ii) determine whether the media packets have been received, and cancel a retransmission timer, on which retransmission of the response message from said apparatus to the initiating terminal is based, once the communications server processing element has determined that the media packets have been received.

14. The apparatus of claim 13, wherein the processing element is further configured to establish the communication session in response to the processing element receiving an acknowledgment message from the initiating terminal in response to the response message without the processing element having received the media packets from the initiating terminal.

15. The apparatus according to claim 14, wherein the processing element is further configured to:
cancel a retransmission timer, on which retransmission of the response message from the apparatus to the initiating terminal is based, once the communications server has determined that the acknowledgment message has been received.

16. The apparatus according to claim 13, wherein the processing element is configured to:
(i) determine a status with respect to transmission of the response message from said apparatus to the initiating terminal; and
after determining that the response message has been transmitted to the initiating terminal, establish the communication session upon receiving whichever arrives first from the initiating terminal: the media packets or the acknowledgment message.

17. The apparatus of claim 13, wherein the processing element is configured to:
(ii) determine whether the media packets have been received; and
cancel a retransmission timer, on which retransmission of the response message from said apparatus to the initiating terminal is based, once the communications server processing element has determined that the media packets have been received.

18. The apparatus according to claim 14, wherein the processing element is further configured to establish the communication session by setting up a session initiation protocol (SIP) session.

19. A system for reducing session setup latency comprising:
a communications server comprising a processing element configured to:
receive a response message made in response to an invite message associated with a communication session initiated by an initiating terminal, and then transmit said response message from said communication server to the initiating terminal, and
establish the communication session in response to receiving media packets from the initiating terminal without having received an acknowledgment message from the initiating terminal in response to the response message;
the initiating terminal comprising a processing element configured to:
determine whether the response message has been received from the communications server,
in response to determining that the response message has been received, determine whether the media packets are available for transmission, and
in response to determining that the media packets are available for transmission, transmit the media packets without transmitting the acknowledgment message; and
at least one of:
(i) said initiating terminal being further configured to transmit the acknowledgment message to the communications server in response to determining that the media packets are not available for transmission;
(ii) said communications server being further configured to determine a status with respect to transmission of the response message from the communications server to the initiating terminal, and after determining that the response message has been transmitted to the initiating terminal, establish the communication session upon receiving whichever arrives first from the initiating terminal, the media packets or the acknowledgment message; or
(iii) said communications server being further configured to determine whether the media packets have been received, and cancel a retransmission timer, on which retransmission of the response message from the communications server to the initiating terminal is based, once the communications server has determined that the media packets have been received.

* * * * *